United States Patent
Bucher et al.

(10) Patent No.: US 12,128,375 B2
(45) Date of Patent: Oct. 29, 2024

(54) METHOD FOR PREPARING A METAL POWDER FOR AN ADDITIVE MANUFACTURING PROCESS AND USE OF SUCH POWDER

(71) Applicant: HYDROMECANIQUE ET FROTTEMENT, Andrezieux Boutheon (FR)

(72) Inventors: Sébastien Bucher, Saint Etienne (FR); Christophe Gérard Pupier, Genas (FR)

(73) Assignee: HYDROMECANIQUE ET FROTTEMENT (FR)

( * ) Notice: Subject to any disclaimer, the term of this patent is extended or adjusted under 35 U.S.C. 154(b) by 403 days.

(21) Appl. No.: 17/632,359

(22) PCT Filed: Jul. 31, 2020

(86) PCT No.: PCT/FR2020/051411
§ 371 (c)(1),
(2) Date: Feb. 2, 2022

(87) PCT Pub. No.: WO2021/023931
PCT Pub. Date: Feb. 11, 2021

(65) Prior Publication Data
US 2022/0280999 A1 Sep. 8, 2022

(30) Foreign Application Priority Data
Aug. 2, 2019 (FR) ..................................... 1908894

(51) Int. Cl.
*C23F 1/00* (2006.01)
*B01J 13/04* (2006.01)
(Continued)

(52) U.S. Cl.
CPC ............... *B01J 13/04* (2013.01); *B22F 1/065* (2022.01); *B22F 1/145* (2022.01); *B22F 1/17* (2022.01);
(Continued)

(58) Field of Classification Search
CPC .................................. C23F 1/00; B22F 1/145
See application file for complete search history.

(56) References Cited

U.S. PATENT DOCUMENTS 3,254,970 A 6/1966 Dittrich et al.
3,914,507 A 10/1975 Fustukian
(Continued)

FOREIGN PATENT DOCUMENTS

CA 3014690 A1 10/2018
CN 106623953 A 5/2017
(Continued)

OTHER PUBLICATIONS

Written Opinion in related PCT Application No. PCT/FR2020/051411, dated Feb. 11, 2021, 4 pages.
(Continued)

*Primary Examiner* — Thomas T Pham
(74) *Attorney, Agent, or Firm* — Dilworth IP, LLC

(57) ABSTRACT

The present invention relates to a method for preparing a metal powder intended for an additive manufacturing process, of the type that involves scanning a bed of powder by a near-infrared laser beam, characterized in that the method comprises: an initial step for selecting a powder, which has an optical reflectivity of higher than 70% for a wavelength ranging between 800 and 1500 nm; then a step for treating said powder, which is different from particle grafting, and which induces a physical and/or chemical surface modification of the grains of said powder, making it possible to lower its optical reflectivity, at the given wavelength. The
(Continued)

invention also relates to the use of such a powder, the grains having, after treatment, a median grain size d50 of between 5 and 50 μm.

12 Claims, 5 Drawing Sheets

(51) Int. Cl.
*B22F 1/065* (2022.01)
*B22F 1/145* (2022.01)
*B22F 1/17* (2022.01)
*B22F 10/28* (2021.01)
*B22F 10/34* (2021.01)
*B33Y 40/10* (2020.01)
*B33Y 70/00* (2020.01)

(52) U.S. Cl.
CPC ............. *B22F 10/28* (2021.01); *B22F 10/34* (2021.01); *B33Y 40/10* (2020.01); *B33Y 70/00* (2014.12); *B22F 2301/052* (2013.01); *B22F 2301/10* (2013.01); *B22F 2301/25* (2013.01); *B22F 2304/10* (2013.01)

(56) References Cited

U.S. PATENT DOCUMENTS

| | | | | |
|---|---|---|---|---|
| 2013/0280547 | A1* | 10/2013 | Brandl | B22F 10/25 427/551 |
| 2015/0337423 | A1 | 11/2015 | Martin et al. | |
| 2017/0368603 | A1 | 12/2017 | Beals et al. | |
| 2018/0133790 | A1* | 5/2018 | Yahata | C22C 21/02 |
| 2019/0032175 | A1 | 1/2019 | Martin et al. | |
| 2019/0240729 | A1 | 8/2019 | Furusawa et al. | |
| 2020/0086387 | A1* | 3/2020 | Sharon | B22F 10/36 |
| 2021/0229350 | A1* | 7/2021 | Chaffins | B29C 64/153 |

FOREIGN PATENT DOCUMENTS

| | | |
|---|---|---|
| EP | 3628417 A1 | 4/2020 |
| FR | 1313303 A | 12/1962 |
| FR | 3066705 A1 | 11/2018 |
| WO | 2018062527 A1 | 4/2018 |
| WO | 2018084056 A1 | 5/2018 |
| WO | 2018199110 A1 | 11/2018 |
| WO | 2019017467 A1 | 1/2019 |

OTHER PUBLICATIONS

International Search Report in related PCT Application No. PCT/FR2020/051411, dated Feb. 11, 2021, 5 pages.
Oerlikon, "Material Product Data Sheet Metco", URL:https://www.oerlikon.com/metco/en/resources/safety-datasheets/XP055688064, (Dec. 31, 2017), 14 pages.
Jadhav, S.D. et al., Mechanical and electrical properties of selective laser melted parts produced from surface oxidized copper powder, ResearchGate, DOI: 10.1002/mdp2.94, Jul. 2019, 12 pages.
Zhou, Y.H. et al., Selective laser melting of typical metallic materials: An effective process prediction model developed by energy absorption and consumption analysis, Accepted Manuscript, https://doi.org/10.1016/j.addma.2018.10.046, Aug. 17, 2018, 48 pages.

* cited by examiner

METHOD FOR PREPARING A METAL POWDER FOR AN ADDITIVE MANUFACTURING PROCESS AND USE OF SUCH POWDER

TECHNICAL FIELD

The present invention relates to a process for preparing a metal powder intended for an additive manufacturing process, of the type that involves scanning a bed of powder by a near-infrared laser beam.

The invention also relates to the use of the metal powder obtained by the preparation method, for an additive manufacturing operation.

The field of the invention is that of preparing metal powders intended for additive manufacture, for all industrial applications, in particular, in the automotive, aeronautical and aerospace sectors.

PRIOR ART

Currently, additive manufacturing technologies of the SLM (Selective Laser Melting) type are developing rapidly, in particular for shaping metal parts. The principle of the SLM process on a powder bed is melting a thin layer of powder (metal, plastic, ceramic, etc.) using a high-power laser.

These technologies make it possible to manufacture components of complex shapes which could not be produced by conventional subtractive machining technologies.

However, the types of metals which can be used in additive manufacturing are relatively limited.

By volume, the main metals used in additive manufacture are superalloys (nickel base, Co—Cr, etc.), certain types of steel and ferrous metals, titanium alloys and certain specific aluminum alloys (AlS10G). Each alloy family corresponds to one or more preferred applications.

Other metals such as copper, precious metals and their alloys are currently very little used in additive manufacturing. On the one hand, their high thermal conductivity rapidly dissipates the energy that is supplied by the laser. On the other hand, their high optical reflectivity disperses the energy of the laser, such as the YAG laser that is conventionally used in machines.

For the same reasons, aluminum and many of its alloys also pose problems in additive manufacturing. It is therefore necessary to use very high laser powers (>300 W) for shaping these metals.

For certain alloys, metallurgical reactions create compounds with structural hardening, generating cracking phenomena, in particular induced by extreme thermal stresses while they are being shaped by laser sintering.

Current additive manufacturing processes are not well suited to producing components in these metals. Nevertheless, many industrial sectors are now interested in metallic 3D printing for improving their products and/or developing new offerings.

FR3066705 proposes a solution for making highly reflective metal powders which are compatible with SLM-type additive manufacturing. This solution consists of modifying the surface of the particles of the powder by depositing nanoparticles into them and, if possible, also by forming a nanostructured layer. For example, for pure copper, copper nanoparticles may be grafted onto copper particles. The techniques presented in this document are treatments for grafting nanoparticles onto the surface of particles. In addition, it is advantageous to avoid using nanoparticles, for hygiene and safety reasons, and due to treatment costs. In this case, the present invention has widespread uses.

DESCRIPTION OF THE INVENTION

The aim of the present invention is to propose a novel method for preparing a metal powder, in particular, for shaping metals that are difficult to "laser" in additive manufacturing, which overcomes the above disadvantages.

For this purpose, the invention relates to a method for preparing a metal powder intended for an additive manufacturing process, of the type that involves scanning a bed of powder by a near-infrared laser beam, characterized in that the method comprises:
  an initial step for selecting a powder, that has an optical reflectivity of more than 70% for a wavelength ranging between 800 and 1500 nm; then
  a step for treating said powder, which is different from grafting particles, and which induces a physical and/or chemical surface modification of the grains of said powder, making it possible to lower its optical reflectivity, at the given wavelength, the grains (4) having, after treatment, a median grain size d50 of between 5 and 50 μm.

Thus, the invention makes it possible to obtain a powder that is more easily lasable after treatment than when it is in its initial state. The treated powder is consists of functionalized grains, or functionalized particles. The powder is devoid of nanoparticles. By reducing the optical reflectivity of the powder, the energy dispersion of the laser may be reduced, thus facilitating the melting of the powder with reduced laser power.

The techniques for measuring the reflectivity and/or reflectance are well known to the person skilled in the art. For example, measurements may be carried out by means of a spectrophotometer.

Other advantageous characteristics of the invention, taken individually or in combination are presented below:
  According to a first embodiment:
  in the initial step, the powder selected comprises at least support particles of a first material, having a first optical reflectivity at the given wavelength,
  the treatment step consists of at least partially functionalizing the surface of the support particles of the first material, by diffusion, by germination-growth or by precipitation, by forming a surface layer of at least one second material having a second optical reflectivity, lower than the first optical reflectivity, thus lowering the optical reflectivity of the powder, at the given wavelength.

After functionalization treatment, the powder consists of composite grains, each comprising a support particle of the first material, and a functionalization surface layer consisting of at least one second material. Functionalization does not result in deposition of nanoparticles grafted onto the support particle, but in a modified surface area of the support particle.

According to optional features of the first embodiment:
  After functionalization treatment, the composite grains have a core-shell structure, each grain having a core constituted by a support particle, and a shell consisting of a surface layer covering between 10 and 100% of the surface of the support particle.
  Functionalization comprises diffusion of at least one second material selected from the families of metals, metalloids, heteroatoms, and flux-type compounds.

Functionalization comprises preliminary deposition, then diffusion heat treatment. Diffusion is actually an additional operation after deposition. Functionalization is therefore not a form of deposition per se, but a transformation of the surface of the support particle by diffusion heat treatment.

Functionalization comprises diffusion of metalloid elements by reacting the surface of the particles with a gas. For example, oxidation carried out in air makes it possible to oxidize the particles superficially. This functionalization treatment is called thermochemical diffusion treatment.

Functionalization comprises germination-growth of a deposit of at least one second material on the particles of the first material. Germination is the phenomenon in which the first germs of the second material appear. Germination influences the microscopic properties (size, purity, morphology and crystal structure) of the second material, in connection to its macroscopic properties. Growth is the phenomenon in which the second material is propagated on the surface of the first material.

Functionalization comprises germination-growth of at least one deposit of several different materials (including the second material) on the particles of the first material.

Germination-growth is carried out with controlled roughness, on the particles of the first material.

Functionalization comprises precipitation of at least one second material, in the form of a compound ensuring the role of flux (chemical etching) during the lasing operation. The term "flux" means an antioxidant chemical compound which makes it possible to remove the oxides and to ensure optimum bonding of the grains under the laser beam. The latter may, for example, be chosen from the halogenated compounds, borax and organic acids. The flow function of the second material therefore involves very particular structural characteristics.

Precipitation is carried out without any germination-growth.

Precipitation is carried out in addition to any germination-growth.

All material used for precipitation is different from the material used for germination-growth.

Functionalization does not modify the composition of the grains by more than 10% by mass.

After treatment, the functionalization surface layer consisting of at least the second material has a maximum thickness of 1 µm per grain.

According to a second embodiment:

in the initial step, the powder selected comprises at least particles of a first material, having a first optical reflectivity at the given wavelength, the treatment step consists in a physical and/or chemical etching causing an increase in the surface roughness of the particles etched, thus lowering the optical reflectivity of the powder, at the given wavelength.

According to a third embodiment, combining the first mode and the second mode, the treatment step comprises:

a first functionalization treatment, after which the powder consists of functionalized particles each comprising a support particle of the first material and a surface layer consisting of at least one second material, then a second treatment comprising a physical and/or chemical etching causing an increase in the surface roughness of the particles etched, thus lowering the optical reflectivity of the powder, at the given wavelength.

According to optional features of the invention, according to one of the three embodiments:

The particles of the first material are chosen from the families of copper and its alloys, aluminum and its alloys, or precious metals and their alloys.

After treatment, surface modification covers between 10 and 100% of the surface of each particle of the first material.

After treatment, surface modification affects a maximum thickness of 1 µm per grain.

Treatment does not modify the composition of the grains by more than 10% by mass.

Treatment lowers the optical reflectivity of the powder for part of the wavelengths ranging between 800 and 1500 nm.

Treatment lowers the optical reflectivity of the powder for all wavelengths ranging between 800 and 1500 nm.

The invention also relates to the use of the metal powder obtained by the method described above, for an additive manufacturing operation.

BRIEF DESCRIPTION OF THE DRAWINGS

The invention will be better understood upon reading the following description which is given only by way of non-limiting example and made with reference to the appended drawings, wherein.

DETAILED DESCRIPTION OF THE INVENTION

FIGS. 1 to 10 illustrate the invention, designed for preparing a metal powder (1) intended for an additive manufacturing process, such as scanning a bed of powder (2) by a near-infrared laser beam (3).

Figure 1:
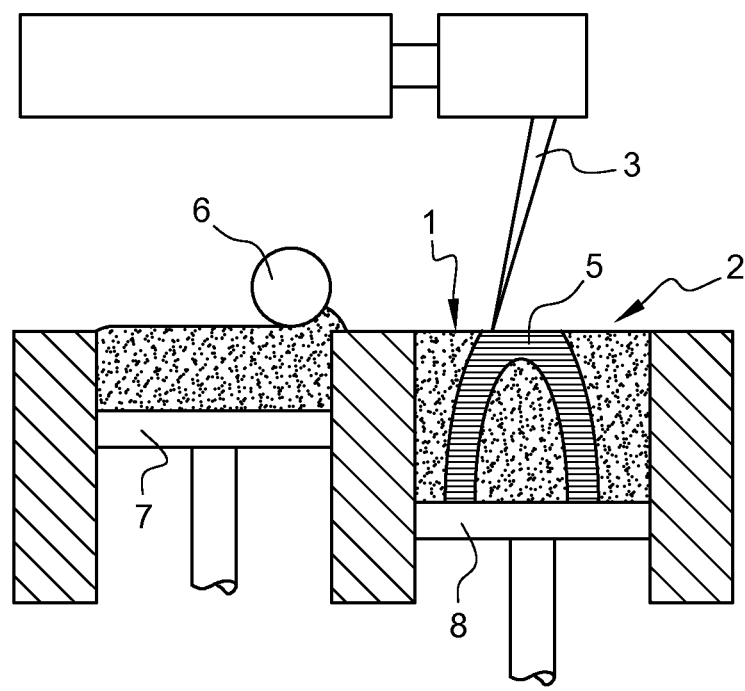
FIG. 1 is a transversal cross-sectional view of an SLS type additive manufacturing facility.
Figure 2:
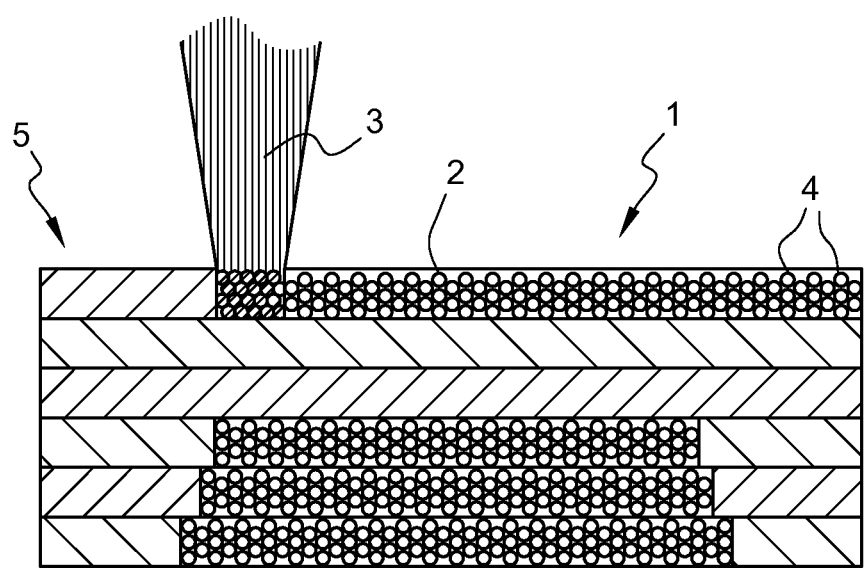
FIG. 2 is a transversal cross-sectional view showing the action of the laser on the powder grains.

FIGS. 1 and 2 show the steps for producing a 3D part (5), by using an SLM additive manufacturing process.

1. A fine layer of powder (1) is spread by a roller (6) from a plate (7) to a piston (8) to form a powder bed (2). At the beginning of the production of the part (5), the piston (7) is at its highest point.

2. This layer is sintered/melted by a high-power laser (3) that traces a 2D section onto the surface of the powder (1). The powder solidifies (1) immediately after the laser (3) has stopped.

3. The piston (7) supporting the 3D part (5) during production descends from the thickness of the layer produced, while the level of the powder feed cartridges is adjusted with that of the plate (7).

4. A new layer of powder is spread out and the process is repeated until the 3D part (5) is obtained.

The powders (1) used alongside this technology generally have a grain size of less than 50 µm, with a distribution depending on the type of machine used. In all cases, the morphology of the powders (1) is more preferentially spherical to obtain optimum flowability and a bed of powder (2) which is as dense and homogeneous as possible.

As mentioned above, certain metals are difficult to laser in additive manufacturing.

Figure 3:
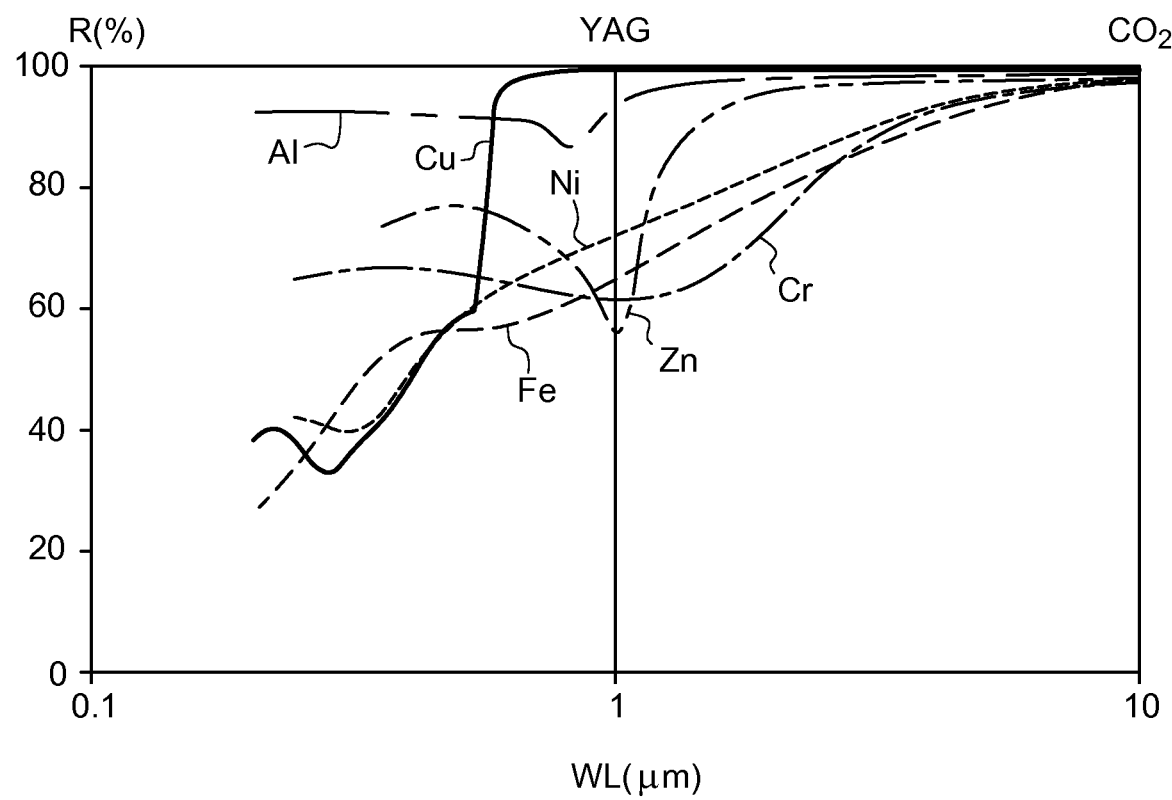
FIG. 3 is a graph showing the reflectivities of aluminum, copper, iron, zinc, nickel, and chromium as a function of the wavelength of the incident laser.

FIG. 3 shows the optical reflectivities (R between 0% and 100%) of aluminum (Al), copper (Cu), iron (Fe), zinc (Zn), nickel (Ni) and chrome (Cr), represented on the ordinate, as a function of the wavelength of the laser (WL in µm), represented on the abscissa with a logarithmic scale.

As can be seen on the right side of the graph, in which a $CO^2$ laser has recorded a wavelength of about 10 µm (between 9.4 and 10.6 µm), the reflectivity (R) of the metals is very high. The $CO_2$ laser is therefore not suitable for lasing these metals.

As can be seen in the center of the graph, in which a YAG laser has recorded an infrared wavelength of about 1,064 nm i.e. 1.064 µm (more generally, ranging between 800 and 1500 nm, i.e. between 0.8 and 1.5 µm), the reflectivity (R) is lower for iron (Fe), zinc (Zn), nickel (Ni) and chrome (Cr), but still high for aluminum (Al) and copper (Cu).

FIGS. 4 to 8 illustrate a first embodiment of the powder preparation method (1) in accordance with the invention.

The solution for shaping the metals mentioned above consists of carrying out surface functionalization of the grains (4) during the preparation of the powder (1).

The powder (1) is functionalized by at least partially functionalizing the surface (11) of the support particles (10) of the first material by forming a surface layer (20) of at least one second material, having a second optical reflectivity which is lower than the first optical reflectivity at the wavelength of the laser (3). This functionalization makes it possible to lower the optical reflectivity of the grains (4), and therefore that of the powder (1), to the chosen wavelength.

Functionalization treatment is chosen to modify the surface of the support particle, without resulting in deposition of nanoparticles.

In practice, the objective may be fourfold:
decreasing the optical reflectivity of the powder (1) with respect to the laser (3), and thus improve the laser/material interaction,
adding elements to the surface of the grains (4) to generate an alloy in situ during shaping,
improving the surface state of shaped components;
avoiding grafting nanoparticles.

Figure 4:
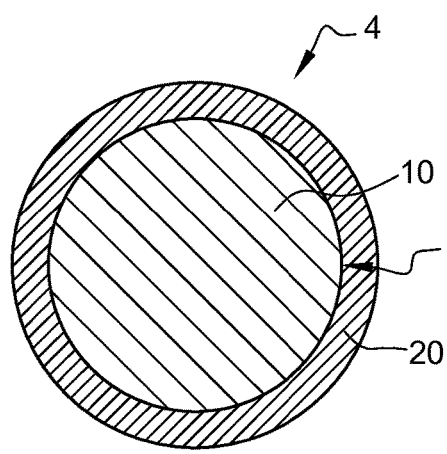
FIG. 4 is a radial cross-section of a functionalized particle, obtained by using the powder preparation method in accordance with a first embodiment of the invention.

FIG. 4 shows a composite grain (4), comprising a core constituted by a support particle (10) of the first material, and a shell consisting of a surface layer (20) of the second material. In this particular example, the shell covers 100% of the surface (11) of the support particle (10). Alternatively, the shell may cover between 10 and 100% of the surface (11). The core of the grain (4) is made of a metal with high optical reflectivity (Al, Cu, precious metal), which is difficult to laser, while the shell of the grain (4) comprises one or more metals with low optical reflectivity, making it possible to reduce the energy dispersion of the laser (3) impinging on the grain (4), and thus to facilitate the melting of the powder (1).

Functionalization may be carried out by using different techniques, for example:

By diffusion of at least one second material selected from the families of metals, metalloids, and heteroatoms.

By germination-growth of a deposit of one or more materials on the particles of the first material (in a known manner, the expression "germination-growth" designates the combination of germination and growth, in the order of germination and then growth).

By precipitation of at least one second material, in the form of a compound ensuring the role of flux (chemical etching) during the lasing operation. The compound is deposited onto the surface of the grain without diffusion.

Whatever the technique used in the scope of the invention, functionalization does not result in deposition of particles grafted onto the support particle, but in a modified surface area of the support particle.

In other words, the technique, grafting particles of the second material onto the support particles of the first material is excluded from the scope of the invention.

According to a particular embodiment, precipitation may be carried out in addition to germination-growth.

Figure 5:
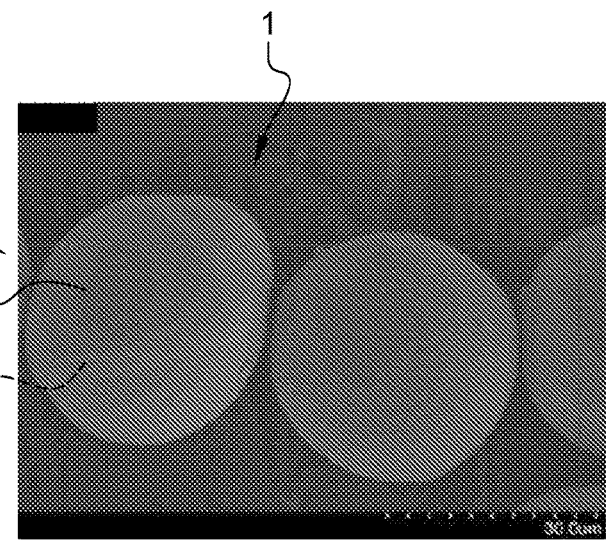
FIG. 5 is a scanning electron microscope (SEM) image of grains consisting of copper particles functionalized by a layer of nickel.
Figure 6:
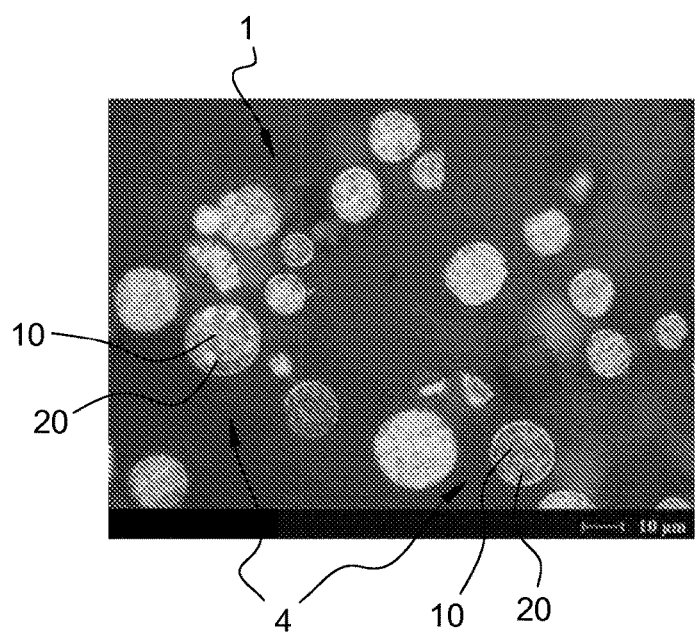
FIG. 6 is a cross-sectional view, on a different scale, of grains consisting of copper particles functionalized by a layer of nickel

FIGS. 5 and 6 illustrate tests carried out on a copper powder (1) functionalized with nickel. The grains (4) comprise a continuous fine layer (20) of nickel on the surface of the copper particles (10). Nickel has low optical reflectivity, and its presence on the surface of the grains (4) makes it possible to considerably improve the laser/material interaction with respect to a pure copper powder.

For example, the powder (1) may have the following characteristics:
Theoretical chemical composition: 90% Copper and 10% Nickel
Apparent density (Hall): 4.57 g cm$^{-3}$
Castability (Hall): 13 s/50 g
grain size: 90%<45 µm According to another example, the powder (1) may have the following characteristics:
Theoretical chemical composition: 90% Copper and 10% Nickel
Apparent density (Hall): 2.94 g·cm$^{-3}$
Castability (Hall): 19 s/50 g
grain size: 100%<50 µm Shaping tests by SLM were then carried out with different copper-based powders, by using a 400 W power laser.

Solid parts that are relatively dense and without cracks were obtained from the functionalized powders (1) according to the invention, described above.

At the same time, non-functionalized pure copper shaping tests were carried out under the same conditions, by using a 400 W power laser. Despite a run to optimize the shaping parameters, it was not possible to obtain utilizable parts from pure copper.

In practice, pure copper may be shaped by SLM, but at very high laser powers (>500 W). The need for a high level of power increases the cost of treatment. Also, the risk laser retroreflection is high and induces a risk for the optical installation.

Figure 7:
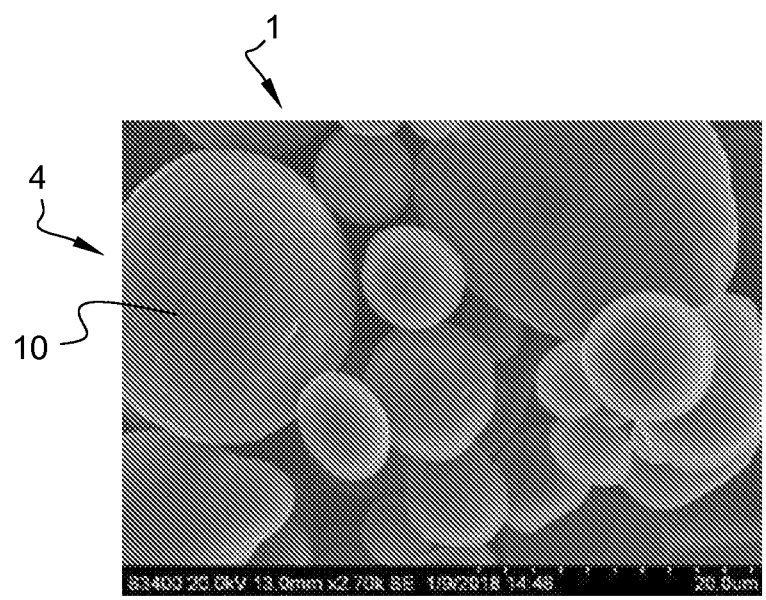
FIG. 7 is an SEM image of aluminum particles prior to functionalization treatment.
Figure 8:
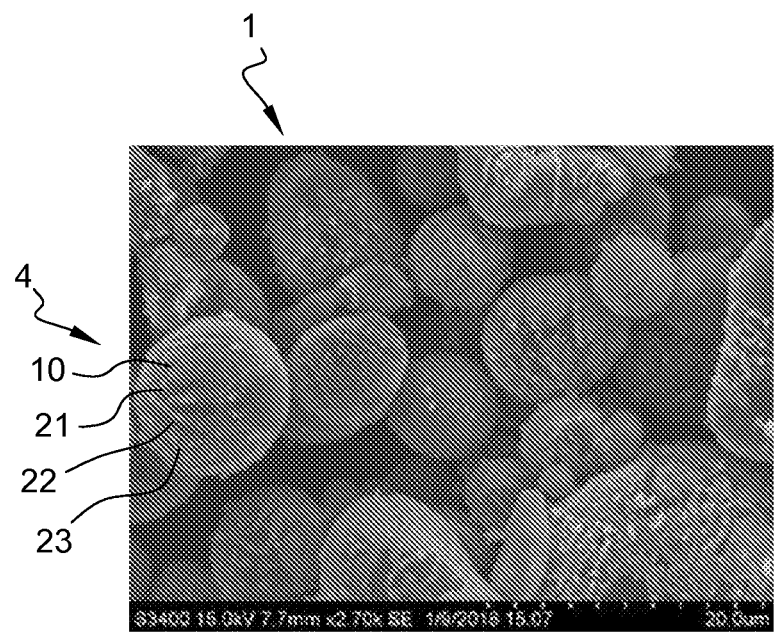
FIG. 8 is an SEM image of grains consisting of aluminum support particles partially functionalized by a deposit consisting of zinc, copper and chrome.

FIGS. 7 and 8 illustrate the development of aluminum alloys. The 7000 series is known particularly for these difficulties of shaping by SLM. According to the invention, pure aluminum particles (10) are pre-functionalized with the constituent elements of the alloy, i.e., copper, zinc, and chromium. Functionalization treatment may be carried out using a wet deposition technique applied by immersion (galvanic displacement). Following the treatment, the alloy is located on the surface of the aluminum particles (10), with a discontinuous shell composed of zinc, copper and chrome islands.

For example, the powder (1) may have the following characteristics:
Theoretical chemical composition:
  Al: 92.27-92.45%
  Zn: 5.4-5.6%
  Cu: 1.5-1.7%
  Cr: 0.23-0.25%
Apparent density (Hall): 1.1 g cm$^{-3}$ This powder (1) may then be shaped by SLM. The surface functionalization treatment makes it possible, on the one hand, to improve the laser/material interaction by decreasing the reflectivity of the powder (1), and, on the other hand, to create the alloy in situ by diffusion.

Figure 9:
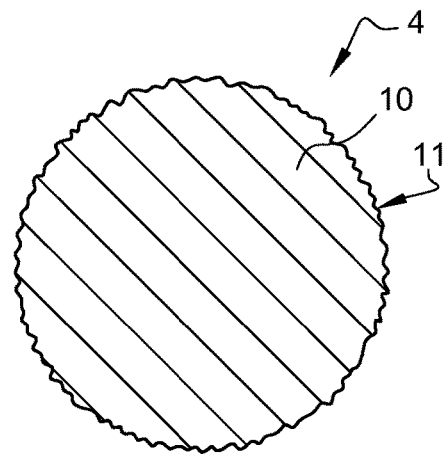
FIG. 9 is a radial cross-section of an etched particle, the surface of which has been modified by chemical etching, using the powder preparation method in accordance with a second embodiment of the invention.

FIG. 9 illustrates a second embodiment of the powder preparation method (1) in accordance with the invention, comprising at least particles (10) of a first material, having a first optical reflectivity at the wavelength of the laser.

In this embodiment, the solution for shaping the low-laser metals consists of carrying out a surface chemical and/or physical etching on the grains (4) during the preparation of the powder (1), causing an increase in the surface roughness of the particles (10). This etching is, for example, chemical etching of the support grains in a wet process, using an acid or a base, or thermochemical oxidation/reduction treatments by a gaseous process in a fluidized bed. This makes it possible to lower the optical reflectivity of the grains (4), and therefore that of the powder (1), to the wavelength of the laser. The laser/material interaction thus is improved.

Figure 10:
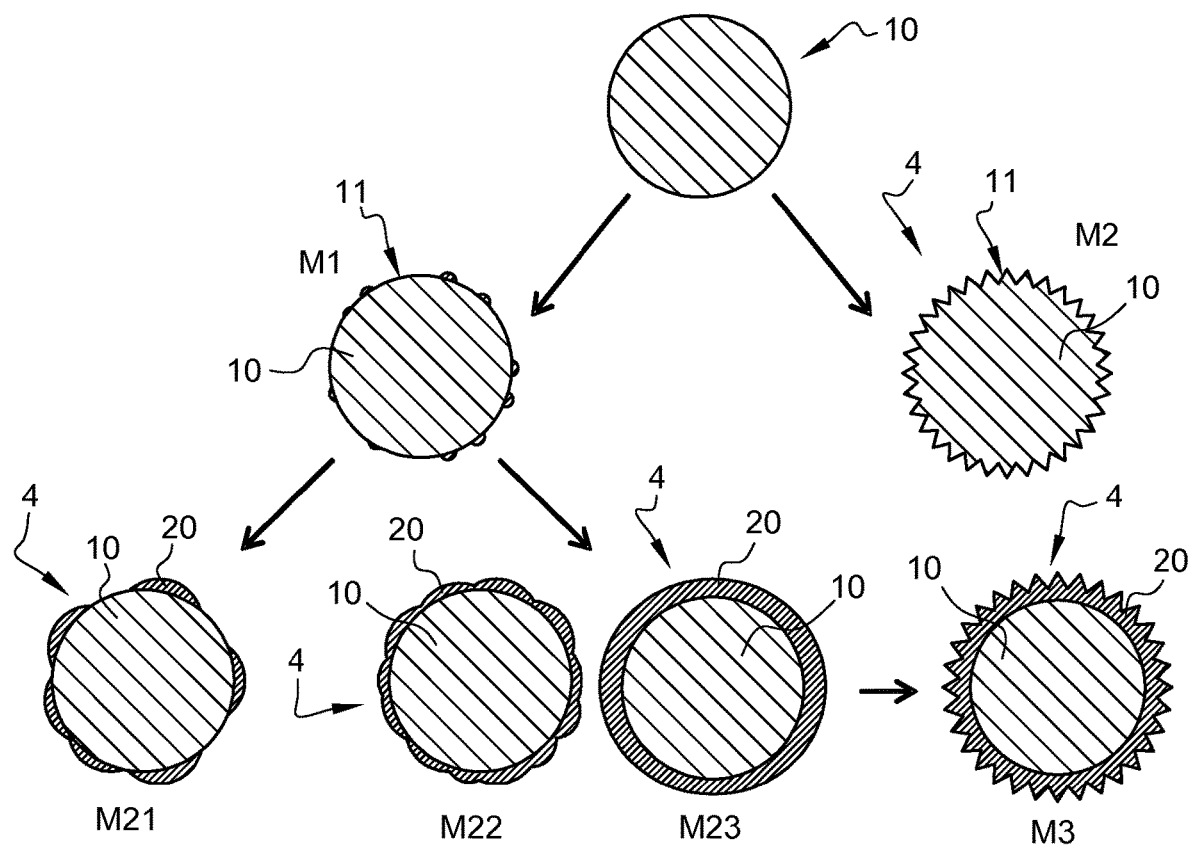
FIG. 10 is a diagram showing radial cross-sections of different particles, to illustrate the different embodiments of the invention.

FIG. 10 illustrate different embodiments of the invention.

In the first mode M1, functionalization is carried out by germination and then growth of a surface layer (20) on a support particle (10). Sub-mode M21 displays partial functionalization, with a discontinuous layer (20). The sub-mode M22 displays continuous functionalization, with large variations in the thickness of the continuous layer (20). The M23 sub-mode displays continuous functionalization, with small variations in the thickness of the continuous layer (20). In sub-modes M22 and M23, the roughness is controlled.

In the second mode M2, surface modification is carried out by physical and/or chemical etching.

In the third mode M3, the particles (10) of the first material undergo functionalization treatment and then the functionalized particles (10+20) undergo physical and/or chemical etching.

Whatever the description of embodiments of the invention:
  the powder initially selected has an optical reflectivity of more than 70% for at least one wavelength ranging between 800 and 1500 nm;
  the treatment makes it possible to lower the optical reflectivity of the powder at least over this given wavelength, ranging between 800 and 1500 nm;
  the treatment is different from grafting particles.

The powder (1) may be shaped differently from FIGS. 4 to 10 without moving away from the scope of the invention which is defined in the claims. Furthermore, the technical characteristics of the various variants mentioned in the description may be combined in their entirety or only in part. Thus, the powder (1) may be adapted to the intended applications.

The invention claimed is:

1. A method for preparing a metal powder intended for an additive manufacturing process, of the type that involves scanning a bed of powder by a near-infrared laser beam, characterized in that the method comprises:
   an initial step for selecting a powder, that has an optical reflectivity of more than 70% for a wavelength ranging between 800 and 1500 nm and comprises at least support particles of a first material, having a first optical reflectivity at the given wavelength; then
   a step for treating said powder, which is different from grafting particles, and which induces a physical and/or chemical surface modification of the grains of said powder, making it possible to lower its optical reflectivity, at the given wavelength, the grains having, after treatment, a median grain size d50 of between 5 and 50 μm, said treatment step comprises at least partial functionalization of the surface of the support particles of the first material, by diffusion or by germination-growth, without resulting in deposition of nanoparticles, by forming a surface layer of at least one second material having a second optical reflectivity, lower than the first optical reflectivity, thus lowering the optical reflectivity of the powder, at the given wavelength.

2. The method according to claim 1, wherein the treatment step comprises functionalization, after which the powder consists of functionalized particles each comprising a support particle of the first material and a surface layer consisting of at least a second material, then a second treatment comprising physical and/or chemical etching causing an increase in the surface roughness of the functionalized particles, thus lowering the optical reflectivity of the powder, at the given wavelength.

3. The method according to claim 2, wherein the at least partial functionalization surface layer consisting of at least the second material has a maximum thickness of 1 μm on each grain.

4. The method according to claim 1, wherein that the at least partial functionalization comprises diffusion of at least one second material selected from the families of metals, metalloids and heteroatoms.

5. The method according to claim 1, wherein that the at least partial functionalization comprises germination-growth of a deposit of at least one second material on the particles of the first material.

6. The method according to claim 1, wherein that the at least partial functionalization comprises precipitation of at least one second material, in the form of a compound ensuring the role of flux during a lasing operation.

7. The method according to claim 1, wherein the at least partial functionalization does not modify the composition of the grains by more than 10% by mass.

8. The method according to claim 1 wherein that treatment does not modify the composition of the grains by more than 10% by mass.

9. The method according to claim 1, wherein that surface modification affects a maximum thickness of 1 μm of each grain.

10. The method according to claim 1, wherein the particles of the first material are chosen from the families of copper and its alloys, aluminum and its alloys, or precious metals selected from gold, silver, platinum or their alloys.

11. The method according to claim 1, wherein after treatment, surface modification covers between 10 and 100% of the surface of each particle of the first material.

12. A method of additive manufacturing comprising using the metal powder obtained by the method according to claim 1.

* * * * *